(12) United States Patent
Liang et al.

(10) Patent No.: US 11,510,064 B2
(45) Date of Patent: Nov. 22, 2022

(54) SECURE WEARABLE WIRELESS PERSONAL SERVER DEVICE

(71) Applicant: Ping Liang, Newport Coast, CA (US)

(72) Inventors: Ping Liang, Newport Coast, CA (US); Biyonka Liang, Newport Coast, CA (US)

(73) Assignees: Lusha Liang, Newport Coast, CA (US); Biyonka Liang, Newport Coast, CA (US)

(*) Notice: Subject to any disclaimer, the term of this patent is extended or adjusted under 35 U.S.C. 154(b) by 397 days.

(21) Appl. No.: 16/755,530

(22) PCT Filed: Sep. 16, 2017

(86) PCT No.: PCT/US2017/051936
§ 371 (c)(1),
(2) Date: Apr. 18, 2020

(87) PCT Pub. No.: WO2018/128651
PCT Pub. Date: Jul. 12, 2018

(65) Prior Publication Data
US 2021/0211881 A1  Jul. 8, 2021

Related U.S. Application Data

(63) Continuation-in-part of application No. PCT/US2017/051936, filed on Sep. 16, 2017.
(Continued)

(51) Int. Cl.
*H04W 12/50* (2021.01)
*A44C 5/00* (2006.01)
(Continued)

(52) U.S. Cl.
CPC .......... *H04W 12/50* (2021.01); *A44C 5/0015* (2013.01); *G06F 3/015* (2013.01); *H04W 12/02* (2013.01);
(Continued)

(58) Field of Classification Search
CPC ..... H04W 12/00; H04W 12/02; H04W 12/06; H04W 12/08; H04W 12/50; H04W 12/63;
(Continued)

(56) References Cited

U.S. PATENT DOCUMENTS

2007/0265533 A1* 11/2007 Tran ..................... A61B 5/0205
600/481
2010/0058480 A1* 3/2010 Hedberg .............. A61B 5/6843
726/26
(Continued)

*Primary Examiner* — Erica Navar
(74) *Attorney, Agent, or Firm* — George Guosheng Wang; Upstream Research and Patent LLC (57) ABSTRACT

This invention presents a non-volatile data storage apparatus that is securely worn by a user like a bracelet that stores the users sensitive information and a wirelessly coupled separate display and input device functioning as the sole or main display and input device functioning together like a single personal mobile device, wherein the non-volatile data storage apparatus authenticates the separate display and input device that it doesn't risk the security or privacy of the sensitive information transmitted to it by the non-volatile data storage apparatus.

20 Claims, 3 Drawing Sheets

Related U.S. Application Data (60) Provisional application No. 62/441,973, filed on Jan. 4, 2017.

(51) Int. Cl.
*G06F 3/01* (2006.01)
*H04W 12/02* (2009.01)
*H04W 52/02* (2009.01)
*H04W 84/12* (2009.01)
*H04W 12/33* (2021.01)
*H04W 12/63* (2021.01)

(52) U.S. Cl.
CPC ....... *H04W 12/33* (2021.01); *H04W 52/0229* (2013.01); *H04W 84/12* (2013.01); *H04W 12/63* (2021.01)

(58) Field of Classification Search
CPC ... H04W 52/0229; H04W 84/12; H04W 4/80; H04W 76/14; H04W 12/68; H04W 12/33; A44C 5/0015; G06F 3/015; G06F 7/00; G06F 1/163; G06F 21/32; G06F 21/35; G06F 21/31; G06F 21/34; G06F 21/6245; G06F 3/0488; G06F 1/1698; G06F 3/147; H04L 63/0861

See application file for complete search history.

(56) References Cited

U.S. PATENT DOCUMENTS

2012/0208463 A1\* 8/2012 Causey .............. G08B 21/0213
455/41.2
2012/0293107 A1\* 11/2012 Ajagbe ................ H04M 19/08
320/101

\* cited by examiner

SECURE WEARABLE WIRELESS PERSONAL SERVER DEVICE

This application claims the benefit of U.S. Provisional Application No. 62/441,973, filed on Jan. 4, 2017.

FIELD OF THE INVENTION

The present application relates to a wearable personal device, and more specifically to a wearable personal device that is secure, stores and serves information to another device with a display.

BACKGROUND

Prior art mobile devices, e.g., smartphones store important personal information of a user and access credentials to online accounts and apps, and must be carried by a user to use any of its functions. To have a bigger display screen means that a user has to carry a bigger device, which becomes too big to securely and comfortably fit in a pocket. When a user loses a mobile device, he risks the theft of his sensitive personal information stored on the device and enabling another person to access his sensitive online accounts and apps. Even though there are ways to remotely disable and wipe a mobile device, a criminal may have gained access to the information and accounts before the user realizes he has lost the device and completed the remote disabling and wiping operation.

Although some mobile devices supporting casting of data, e.g., photos and video, on to a larger screen, e.g., a TV, the larger screen device does not have write access to the mobile device. In some applications where a large screen is readily available, a user desires to input data or interact with data via a large display screen and have the input or interaction recorded on his personal mobile device. Such cases are not supported by prior smartphones. Furthermore, the form factor of the prior art smartphones is neither optimal nor a necessity. Embodiments of this invention overcome the above and other shortcomings and limitations in the related prior art.

DETAILED DESCRIPTION OF THE PRESENT INVENTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block represents both a method step or an apparatus element for performing the method step. Depending upon the implementation, the corresponding apparatus element may be configured in hardware, software, firmware or combinations thereof. Hereafter, the term smartphone is used to represent any device a user carries or uses to access information, including smartphones, tablets, laptop computers, or a display device etc.

An embodiment of this invention is a new generation of smartphone or more generally Mobile Personal Device (MPD) that comprises a Wearable Wireless Personal Server (WWPS) that can be coupled with more than one Processing and Display Devices (PDDs), either one at a time at different time instances or simultaneously, that are physically separated from the WWPS via a high speed wireless connection, wherein the WWPS and the one or more wirelessly coupled PDDs together provide functions that include the functions of or similar to a present-day smartphone, tablet or other mobile devices. To further clarify, by physically separated it means that the WWPS and a PDD are two separate physical objects that each has its physical enclosure, is physically detached from each other, and they may communicate or transmit information between them through wireless means when both are within their user's personal space. Furthermore, a PDD may be coupled to the WWPS of more than one users, or shared publicly by a large number of users, preferably by coupling to one user's WWPS at a time.

Figure 1:
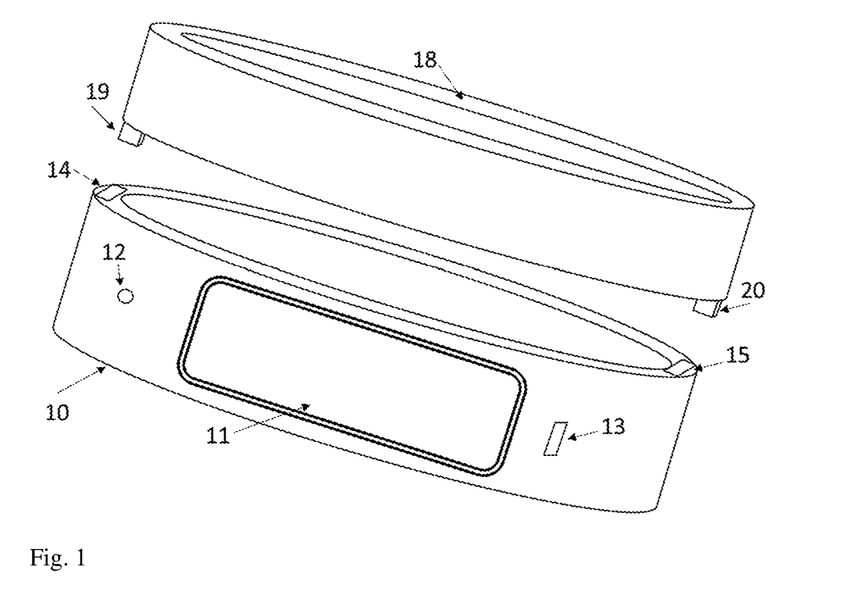
FIG. 1 shows a first bracelet form factor embodiment enclosing a Wearable Wireless Personal Server (WWPS) and a secondary companion bracelet enclosing a backup battery and other optional extensions.
Figure 2:
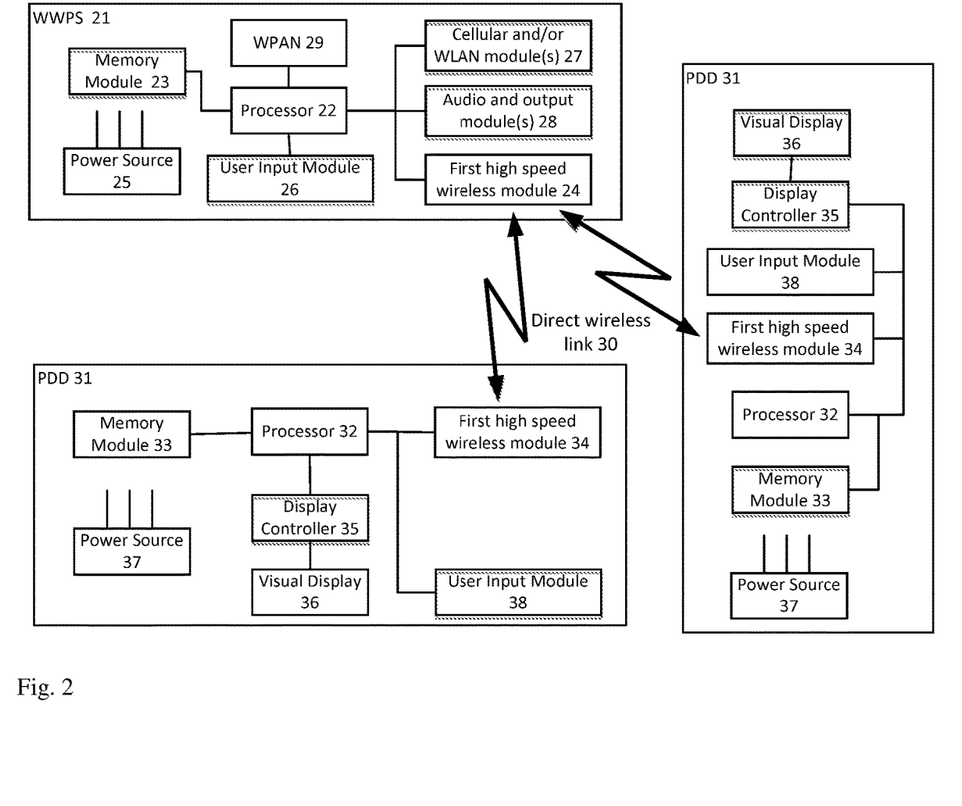
FIG. 2 shows one embodiment of a WWPS wirelessly coupled to two Processing and Display Devices (PDDs).

In one embodiment, a WWPS comprises a case or shell that houses or encloses the other components of the WWPS and are in a form factor that can be securely worn on or attached to a user's body, e.g., as a bracelet (see 10 in FIG. 1), necklace or other form of jewelry that has an aesthetic value, hereafter all referred to as a bracelet; a processor 22; a power source 25, preferably rechargeable, e.g., a rechargeable battery; a memory module 23 (preferably non-volatile) that stores personal or sensitive information of the user (hereafter referred to as the owner) and programs to be executed by the processor to implement the functions of the WWPS 21 or 41; a first wireless module 24, preferably sufficiently high speed for communicating graphical information, for establishing a direct wireless connection and communication with one or more coupled PDDs 31 or 51, including accepting input from and transmitting information to the one or more coupled PDDs 31 or 51 wherein a PDD 31 or 51 is physically separate from the WWPS 21 or 41 and functions as a graphic display and input device for the WWPS, e.g., similar to the function of the touchscreen module and the associated controller in a present-day smartphone; and optionally a user input module 26 for accepting user inputs directly on the WWPS, e.g., through an embedded touchscreen or gesture or motion of the bracelet 10 enclosing the WWPS. FIG. 2 illustrates a WWPS wirelessly coupled with two PDDs.

Figure 3:
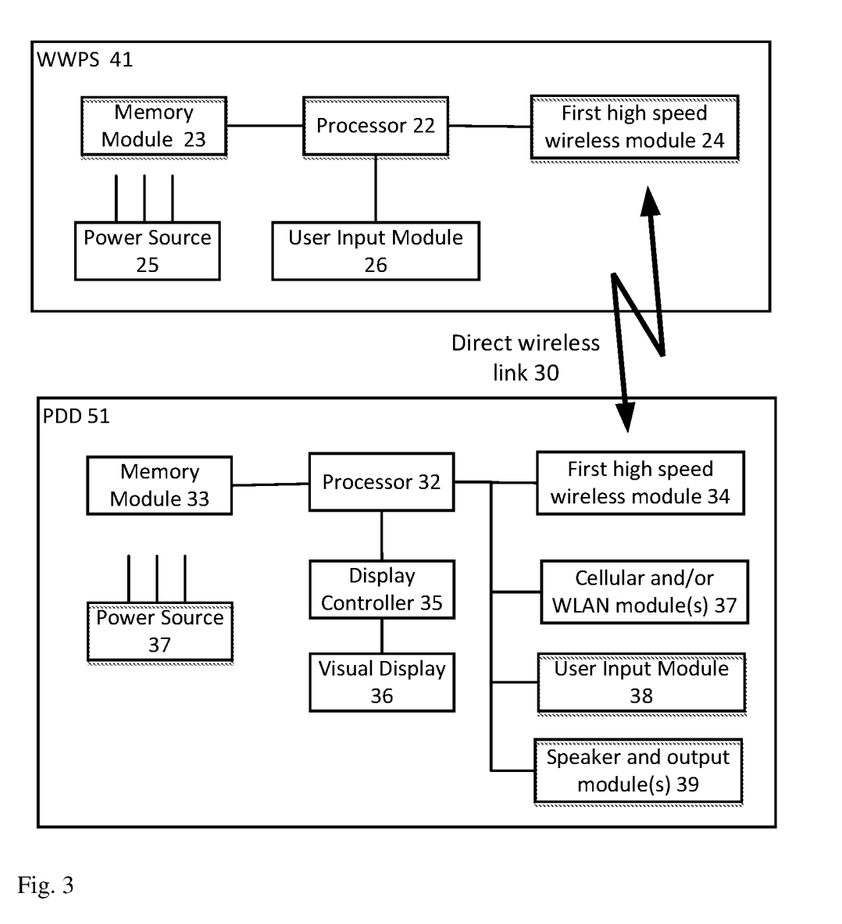
FIG. 3 shows another embodiment of a WWPS wirelessly coupled to one PPD.

On the other side as shown in FIGS. 2 and 3, a PDD comprises a visual display 36, e.g., touchscreen or a projection module that can project a two- or three-dimensional display; a processor 32; a display controller 35 which can be same or combined into the processor 32; a power source 37, preferably rechargeable, e.g., a rechargeable battery; a memory module 33 (preferably non-volatile) that stores programs to be executed by the display processor or controller to implement the functions of the PDD and settings or preferences of the present user; a first wireless module 34, preferably sufficiently high speed for communicating graphical information, for establish a direct wireless link with a WWPS to communicate with, including accepting information from and transmitting user input on the PDD to a WWPS coupled with the PDD at the present time; and optionally a user input module 38 for accepting user inputs, e.g., through on-screen touch keyboard, drawings on screen, movement or gesture that interact with a two-dimensional or three-dimensional holographic optical projection produced by the visual display module 36. Furthermore, to ensure the privacy of a user's data, a PDD can limit the connection to be with one WWPS exclusively at a time to prevent a nearby second WWPS to secretly connect to and receive information from a PDD that is already connected to and is displaying information for a first WWPS.

In an embodiment a WWPS that can wirelessly couple with one or more PDDs at one time instant and couple with another set of one or more PDDs at another time instant, as illustrated in FIG. 2 with a WWPS 21 coupled to two PDDs 31 through the direct wireless link 30, a wearer of a WWPS can use any compatible PDDs that are available, most convenient or best suited to the task or application at hand, instead of being tied and limited to display and input functions of the touchscreen integrated with a present-day smartphone. It is not hard to envision a future time when display and input devices that can function as PDDs are widely available at places where people live, work and play, users do not need to carry their personal PDD, they just need to have their WWPS that is securely worn on the body. They can use the PDDs that are available in their environment.

In one embodiment, a WWPS 21 includes functions of storage and serving of personal and sensitive information; wireless networking module(s) 27 for communication with mobile networks such as a LTE, 5G or future cellular network and/or a WLAN, to provide connectivity to a local and/or wide area network such as the Internet; processing of information on processor 22, an optional audio, speaker, tactile or other output module 28, a Wireless Personal Area Network (WPAN) module 29 to support a wireless headset, e.g., a Bluetooth or BLE headset, or connecting with other sensors or personal devices that the owner carries on his body, and an embedded first wireless module 24 for communication with a PDD, while a PDD provides the visual display 36, further comprising an embedded first wireless module 34 for communication with a WWPS, graphic display control and processing 32 and/or 35, memory 33, and power source 37, which may be a battery within the PDD or an external power source. The user input function may be provided by either or both of user input modules 38 in the PDD and 26 in WWPS. In another embodiment, a WWPS 41 stores (using memory module 23) and serves (using processor 22) the personal or sensitive information of the owner to a coupled PDD 51 using an embedded first wireless module 24 for coupling and communication with a PDD, while the functions of mobile wireless network connections 37, e.g., for cellular and/or wireless local area network (WLAN) module(s), processing 32 and display of information 35 and 36, a speaker or other output function 39, and accepting user input 38 are all implemented in a PDD, in addition to an embedded first wireless module 34 for communication with a WWPS via the wireless link 30, as shown in FIG. 3. Yet another embodiment is a mix of the above two, with a partition of functions that is between the two extremes above.

In one embodiment, a software change is made to a prior art smartphone for it to function as a PDD for a WWPS wherein the prior art smartphone no longer stores personal or sensitive information, instead it sends such information to be stored in a WWPS and retrieves the information from the WWPS when it is required. Similarly, a software can be installed in a PC or other type of device with processing and display functions to make it function as a PDD for a WWPS wherein personal or sensitive information are read from and/or stored in a WWPS.

A WWPS may further comprise an attached small display screen 11 for displaying status and short pieces of information, a touchscreen 11 for input to configure the device, a microphone 12 for voice input or gesture sensors 13, e.g., gyro and/or accelerometer, for receiving input or commands from the owner.

In one embodiment, a WWPS includes a biometric recognition function module that recognizes that it is being worn by its registered owner using one or more physiological signals including heart generated pulses, electrical signals on skin, skin impedance, body temperature, optical signals, motion patterns etc. and their change patterns, or bodily features such as skin texture and pattern, patterns of vein and capillaries under-skin. Furthermore, it monitors one or more biological signals to detect the removal of the WWPS from its owner's body, and activates a sequence of actions once the separation is detected, e.g., locking down of the WWPS, sending alerts, sounding alarm, requiring recognition of the owner again when it is worn again by a user. A WWPS may encrypt stored information at all times, or encrypts stored information when the WWPS is separated from its owner.

In one embodiment, to increase security and protect privacy, a WWPS only sends and accepts sensitive information with a PDD whose pairing with the WWPS has been authorized by the owner of the WWPS. A pairing process of a WWPS and PDD may use a Near Field Communication (NFC) module embedded in each to initiate the pairing or connection process by tapping a WWPS on a PDD or bring it to close proximity to a PDD, and/or may require the owner of a WWPS to accept the paring and connection with a PDD before it is coupled with the WWPS. To ensure the privacy of the user's data, in one embodiment, a WWPS monitors the idle time that is absent of interaction of a WWPS' owner with a coupled PDD or the distance of separation between the WWPS and a coupled PDD, when a threshold is reached or when the WWPS and/or the coupled PDD detects the disconnection of the direct wireless link between them, either the WWPS or a cloud server automatically sends a command to the PDD to complete a Clean-Up Action (CUA), which may include erasing or wiping clean of the display of the user's information on the PDD, refresh or randomize the after-effect trace of the PDD, e.g., burn-in in a display screen after an image is displayed on the screen for an extended period of time, reset or randomize the memory module in the PDD to remove information of a disconnected user. The CUA on a PDD can also be initiated by the owner of a coupled WWPS, which may be a gesture by the owner using the WWPS, a tap pattern on or using the WWPS, or a voice command to a WWPS etc.

To ensure the privacy of a user's information, a WWPS or its owner can authenticate a PDD that is for use by the public or multiple users before connecting with it. The authentication may be done using an authentication module embedded in the PDD. It may further be verified online by a server of an authentication authority. The authentication certifies that the PDD will not record a user's information and will complete the CUA faithfully when required. It may further certify that a PDD will establish connection with one WWPS exclusively at a time to prevent a nearby second WWPS to secretly connect to and receive information from a PDD that is already connected to and is displaying information for a first WWPS.

In another embodiment, a WWPS has a standard wired connection port 14, e.g., a USB port, either an attached USB connector or a USB port that accepts a USB cable, and through which the WWPS can be accessed as an external storage drive, e.g., a USB drive, by a computer or another device. Furthermore, the WWPS's battery can be charged via the wired connection port 14, e.g., a USB connection. In yet another embodiment, the same bracelet containing the WWPS is equipped with a light emitting device, e.g., an LED, so that the WWPS can be used as a flashlight, powered by the battery in the same bracelet that also powers the WWPS, that is always available to its owner.

A WWPS can provide even more functions as a device controller, a mobile payment device, or containing a wireless headset for voice communications, etc. In one embodiment, a WWPS is equipped with the function to recognize, authenticate if needed, and command an Internet of Things Device (IoTD), e.g., a home appliance, a home automation controller, etc. A WWPS may recognize an IoTD through wireless pairing, e.g., Bluetooth pairing, or NFC and tapping, or scanning. Once the WWPS and IoTD are connected, the WWPS can send commands to the IoTD to change setting, perform a function, report data or status. The WWPS can control the display information received from IoTD on a display associated or attached with the IoTD, on a small screen embedded on the bracelet enclosing the WWPS, or a PDD wirelessly connected to the WWPS. In another embodiment, a WWPS is equipped with an electronic wallet and payment module for making purchases and payments through NFC, proximity or scanning. The bracelet form factor of the WWPS provides a secure means for its owner to carry the electronic wallet and payment module with him. In another embodiment, the WWPS further comprises a cellular phone module and a WPAN module 29, e.g., Bluetooth, Bluetooth Low Energy (BLE), so that its owner can connect the audio signals from the cellular phone to a wireless headphone using the same WPAN protocol. In yet another embodiment, the bracelet form factor of a WWPS contains a storage compartment or an attachment mechanism to store or securely attach a wireless headphone, e.g., Bluetooth headphones that can be used to wirelessly listen to audio signal. It may further contain a microphone for recording speech or carrying out a conversation, e.g., a phone call. The wireless headphone can be two pieces one for each ear for stereo audio sound. While the wireless headphone is stored or attached to the bracelet, its battery can be charged by the larger capacity battery in the bracelet. In yet another embodiment, a WWPS functions as a wide area network connected personal router and network attached storage to its owner's PAWN to provide storage and wide area network connectivity to the PAWN devices the owner is carrying or wearing, e.g., physiological signal sensors, health or activity monitors, drug delivery pumps, etc. In yet another embodiment, one or more physiological signal sensors, health or activity monitors are integrated with the WWPS in the same bracelet and the WWPS provides the processing, analysis and network connectivity to the said sensors and monitors to enhance their functions and make them more useful to the user.

In one embodiment, the bracelet contains a sufficiently large capacity battery and a charging port 15 so that the bracelet can be used to charge another mobile device, e.g., a prior art smartphone or a PDD. Another embodiment uses a second bracelet 18 that is a backup power companion to a first bracelet 10 wherein the first bracelet 10 contains a WWPS, and the second bracelet 18 provides a backup battery. The companion second bracelet 18 may also provide other functional expansions such as additional memory, a co-processor to enhance the performance, additional wireless networking module to provide expanded wireless connectivity and throughput, etc. The two bracelets are equipped with matching connector(s) and port(s), and when they are snapped together, the connector of one inserts into the receiving port of the other to achieve the intended power or functional expansion, e.g., when power output connector 19 is inserted into receiving port 14, the battery in the second bracelet 18 charges the battery in the first bracelet 10 or provides a backup power source to the WWPS in the first bracelet 10. Additional connector and port, e.g., 20 and 15, can be used to provide additional signal connections and/or mechanical coupling to secure the two bracelets together.

In light of the above description, the present invention provides the following exemplary embodiments:

Embodiment #1. A Wearable Wireless Personal Server (WWPS) comprising a case or shell in a form factor that can be securely worn on or attached to a user's body and houses the components of the WWPS; a first wireless module for establishing a direct wireless connection and communication with one or more wirelessly coupled Personal Display Devices (PDDs) wherein a PDD is in its own physical enclosure, is physically separate from the WWPS and functions as a graphic display and/or input device for the wirelessly coupled WWPS; an authentication module that manages the wireless pairing with and authentication of one or more PDDs; a data security module that manages what information can be sent to and/or accepted from a PDD based on its security authentication; a memory module that stores personal or sensitive information of the user and the programs to be executed by the processor to implement the functions of the WWPS; a processor that serves the information stored in the memory module for display on one or more PDDs wirelessly coupled with the WWPS through the first wireless module; and a power source.

Embodiment #2. The Wearable Wireless Personal Server in Embodiment #1 wherein the case or shell in the form factor of a bracelet worn on a wrist of a user.

Embodiment #3. The Wearable Wireless Personal Server in Embodiment #1 wherein the processor further processes stored or received information on the processor before serving for display on one or more PDDs wirelessly coupled with the WWPS through the first wireless module.

Embodiment #4. The Wearable Wireless Personal Server in Embodiment #1 wherein the first wireless module receives input entered on or using one or more coupled PDDs and provides the received input as user input to the WWPS.

Embodiment #5. The Wearable Wireless Personal Server in Embodiment #1 further comprising a wireless networking module for establishing connectivity to a local and/or wide area network to support data communication needs of the WWPS and/or one or more PDDs wirelessly coupled with the WWPS through the first wireless module.

Embodiment #6. The Wearable Wireless Personal Server in Embodiment #5 wherein the processor executes one or more application programs stored in the memory module wherein the connection to a wireless network is provided by the wireless networking module, and the visual display of the one or more executing application programs is provided by one or more PDDs wirelessly coupled with the WWPS through the first wireless module.

Embodiment #7. The Wearable Wireless Personal Server in Embodiment #1 further comprising a Wireless Personal Area Network (WPAN) module to provide network connectivity, processing, analysis, and/or storage to one or more personal devices that a user carries on or embedded in his body.

Embodiment #8. The Wearable Wireless Personal Server in Embodiment #7 wherein the one or more personal device is a physiological signal sensor, a health or activity monitors, a drug delivery pump, a device that produces an output signal, or a wireless headset.

Embodiment #9. The Wearable Wireless Personal Server in Embodiment #1 further comprising one or more input and/or output module embedded in the case or shell.

Embodiment #10. The Wearable Wireless Personal Server in Embodiment #9 wherein the one or more input or output module is a touchscreen, a microphone, a gesture sensor, physiological signal sensor, a health or activity monitor, a display screen, a speaker, a tactile output device, a drug delivery pump, or a device that produces a signal that causes an action.

Embodiment #11. The Wearable Wireless Personal Server in Embodiment #1 wherein the security module encrypts the information stored in the WWPS.

Embodiment #12. The Wearable Wireless Personal Server in Embodiment #1 wherein the security module uses biometric recognition to recognize that it is being worn by its registered owner.

Embodiment #13. The Wearable Wireless Personal Server in Embodiment #1 wherein the security module monitors one or more biometric or physiological signals of the owner to detect removal of the WWPS from the owner's body.

Embodiment #14. The Wearable Wireless Personal Server in Embodiment #13 wherein the security module further causes one or more actions to be activated once a removal is detected to maintain the security of the owner's data.

Embodiment #15. The Wearable Wireless Personal Server in Embodiment #1 wherein the security module detects close proximity, motion, gesture, physical contact or a combination to initiate a pairing process.

Embodiment #16. The Wearable Wireless Personal Server in Embodiment #1 wherein the security module monitors the idle time of interaction with a coupled PDD, the distance of separation between the WWPS and a coupled PDD, or status of the direct wireless connection with a couple PDD, and initiates unpairing with the PDD when a condition is met.

Embodiment #17. The Wearable Wireless Personal Server in Embodiment #1 wherein the security module causes a command to be sent to the PDD to complete a clean-up action.

Embodiment #18. The Wearable Wireless Personal Server in Embodiment #1 wherein the security module accepts an instruction from the owner and causes a command to be sent to a coupled PDD to complete a clean-up action.

Embodiment #19. The Wearable Wireless Personal Server in Embodiment #1 wherein the security module authenticates that a shared PDD will maintain the security and privacy of user's information before pairing with it.

Embodiment #20. The Wearable Wireless Personal Server in Embodiment #1 wherein the authentication module accesses a secure authentication module embedded in a PDD to authenticate it.

Embodiment #21. The Wearable Wireless Personal Server in Embodiment #1 wherein the authentication module accesses an online authentication authority to authenticate a PDD.

Embodiment #22. The Wearable Wireless Personal Server in Embodiment #1 wherein the authentication module further authenticates that the PDD will establish connection with one WWPS exclusively at a time.

Embodiment #23. The Wearable Wireless Personal Server in Embodiment #1 further comprising a wired connection port through which the WWPS can be accessed as an external storage drive by a computer or another device.

Embodiment #24. The Wearable Wireless Personal Server in Embodiment #23 wherein the WWPS's battery can be charged via the wired connection port.

Embodiment #25. The Wearable Wireless Personal Server in Embodiment #1 further comprising a charging port to charge the battery of another mobile device.

Embodiment #26. The Wearable Wireless Personal Server in Embodiment #1 further comprising a light emitting device powered by the power source of the WWPS for the WWPS to be used as a flashlight.

Embodiment #27. The Wearable Wireless Personal Server in Embodiment #1 further comprising a mobile payment module for the WWPS to be used as a secure mobile payment device.

Embodiment #28. The Wearable Wireless Personal Server in Embodiment #1 further comprising a controller module or function to interact or control an Internet of Things Device (IoTD).

Embodiment #29. The Wearable Wireless Personal Server in Embodiment #28 wherein the WWPS recognizes and connects with an IoTD wirelessly.

Embodiment #30. The Wearable Wireless Personal Server in Embodiment #29 wherein the WWPS sends commands to the IoTD to perform one or more of changing its setting, perform a function, to receive data, or report back data or status.

Embodiment #31. The Wearable Wireless Personal Server in Embodiment #29 wherein the WWPS displays information to or from an IoTD on a display associated or attached with the IoTD, on a screen embedded on the WWPS, or a PDD wirelessly connected with the WWPS.

Embodiment #32. The Wearable Wireless Personal Server in Embodiment #1 further comprising a storage compartment or an attachment mechanism to store or securely attach an accessory device that is wirelessly connected to the WWPS wherein the accessory device can be removed and physically a distance away from the WWPS at the time of use.

Embodiment #33. The Wearable Wireless Personal Server in Embodiment #32 wherein the accessory device is one or more wireless headsets.

Embodiment #34. The Wearable Wireless Personal Server in Embodiment #32 wherein the accessory device's battery is charged by the power source in the WWPS when the accessory device is stored in or attached to the WWPS.

Embodiment #35. A companion device for a Wearable Wireless Personal Server (WWPS) comprising a case or shell in a form factor that matches the WWPS and can be worn on a user's body next to the WWPS; and a power source that charges the WWPS when the companion device is worn next to the WWPS or connected to the WWPS.

Embodiment #36. The companion device in Embodiment #35 further comprising one or more expansion modules that expand the function of the WWPS Embodiment #37. The companion device in Embodiment #36 wherein the one or more expansion modules include one or more of a memory module to expand the memory of the WWPS, a co-processor module to enhance the performance of the WWPS, an additional wireless networking module to provide expanded wireless connectivity and/or throughput, etc.

Embodiment #38. The companion device in Embodiment #35 further comprising one or more matching connector(s) and/or receptacle port(s), and when the companion device is worn next to the WWPS, a connector on one device can insert into a matching receptacle port on the other device to achieve the intended charging function or an expansion of a functionality.

Embodiment #39. A Personal Display Device (PDD) providing visual display for a wirelessly connected Wireless Wearable Personal Server (WWPS) comprising an embedded first wireless module for communication with a coupled WWPS; a graphic display control and processing module; a memory module; a power source; and a display screen, wherein the PDD is in its own physical enclosure separate from the WWPS and functions as a graphic display and input device for a wirelessly coupled WWPS wherein the data for the graphic display is served by the WWPS through the first wireless module Embodiment #40. The Personal Display Device in Embodiment #39 further comprising one or more input and/or output modules.

Embodiment #41. The Personal Display Device in Embodiment #40 wherein the one or more input or output module is a touchscreen, a microphone, a gesture sensor, a motion sensor, a speaker, or a device that produces a signal that causes an action.

Embodiment #42. The Personal Display Device in Embodiment #39 further comprising a mobile wireless networking module providing connection to a wireless network; and a processor that executes one or more application programs, retrieves data or programs needed by the execution of the one or more application programs from a coupled WWPS via the wireless connection or from a wireless network via the wireless networking module.

Embodiment #43. The Personal Display Device in Embodiment #39 further comprising a security module which provides authenticated guarantee of the security and privacy of the data of each user.

Embodiment #44. The Personal Display Device in Embodiment #39 further comprising The Wearable Wireless Personal Server in Embodiment #1 wherein the security module authenticates a shared PDD will maintain the security and privacy of user's information before pairing with it.

Embodiment #45. The Personal Display Device in Embodiment #43 further comprising a secure authentication module as part of the security module and communicates with a WWPS to authenticate to the WWPS.

Embodiment #46. The Personal Display Device in Embodiment #43 wherein the security module accesses an online authentication authority to authenticate a WWPS.

Embodiment #47. The Personal Display Device in Embodiment #43 wherein the security module further authenticates that the PDD will establish connection with one WWPS exclusively at a time.

Embodiment #48. The Personal Display Device in Embodiment #43 wherein the security module permanently erases the data of a coupled WWPS upon disconnection from the WWPS or upon receiving a clean-up command from a coupled WWPS or from an authenticated server.

Embodiment #49. The Personal Display Device in Embodiment #43 wherein the PDD can be coupled to the WWPS of more than one users, or shared publicly by a large number of users, and the security module guarantees the separation, security and privacy of the data of each user.

Embodiment #50. The Personal Display Device in Embodiment #39 wherein a Personal Computing Device (PCD) is used as a PDD wherein the role of the embedded first wireless module for communication with a coupled WWPS is played by wireless local area network module in the PCD, the ole of the graphic display control and processing module is played by the graphics controller in the PCD, the role of the memory module is played by the memory or storage device in the PCD, the power source is provided by the battery in the PCD, and the screen in the PCD is used as the display screen and a software module installed on the PCD configures the PCD to function as a PDD.

Embodiment #51. A system comprising the Wearable Wireless Personal Server of Embodiment #1 and the companion device of Embodiment #35

Embodiment #52. A system comprising the Wearable Wireless Personal Server of Embodiment #1 and the Personal Display Device of Embodiment #39.

Embodiment #53. A system comprising the Wearable Wireless Personal Server of Embodiment #1, the companion device of Embodiment #35, and the Personal Display Device of Embodiment #39.

In light of the above description, the present invention provides the following exemplary embodiments:

Embodiment ∩ 1. A non-volatile data storage apparatus comprising a bracelet or similarly shaped enclosure that is fit to be securely worn by wrapping around a part of a user's body; and components contained within or mechanically attached to the enclosure comprising a non-volatile memory module that stores sensitive information of the user of the non-volatile data storage apparatus including information that are needed for the user to access or use a network, online account or app; a first wireless module for coupling the apparatus with a separate device functioning as a display and input device or for coupling with a separate device functioning as a display device and another separate device as an input device for accessing or using a network, online account or app wherein the coupling is through a corresponding wireless module in the separate device(s), a processor that protects the sensitive information stored in the non-volatile memory module by allowing or disallowing, the connection for transmission of the sensitive information stored in the non-volatile memory module to enable the separate device(s) to provide the display and input function for the user to access or use a network, online account or app, wherein the processor allows the connection for transmission of the sensitive information in the non-volatile memory module to a coupled separate device through the first wireless module only after the processor receives authentication that the separate device will not breach the security or privacy of the sensitive information transmitted to it by the apparatus, and wherein when the apparatus is coupled with the separate device through the first wireless module and when the connection for transmission of sensitive information from the apparatus to the separate device is allowed by the processor, the non-volatile memory module in the apparatus and one or more components in the separate device function together like a single information processing device with the apparatus providing and/or storing sensitive information for the said single information processing device to access or use a network, online account or app and the separate device(s) providing the display and input function for the said single information processing device to access or use a network, online account or app.

Embodiment ∩ 2. The non-volatile data storage apparatus according to Embodiment ∩ 1, wherein the authentication that the separate device will not breach the security or privacy of the sensitive information transmitted to it by the apparatus includes authentication that the separate device will not transmit to a third party the sensitive information transmitted to it by the apparatus.

Embodiment ∩ 3. The non-volatile data storage apparatus according to Embodiment ∩ 1, wherein the authentication that the separate device will not breach the security or privacy of the sensitive information transmitted to it by the apparatus includes authentication that the sensitive information transmitted to it by the apparatus will be permanently erased if the connection between the apparatus and the separate device becomes unreliable or is turned off or disconnected, the apparatus is no longer in sufficiently close vicinity of the separate device, or the processor transmits a clean-up command to the separate device.

Embodiment ∩ 4. The non-volatile data storage apparatus according to Embodiment ∩ 1, wherein the processor receives from the separate device through the first wireless module the authentication that the separate device will not breach the security or privacy of the sensitive information transmitted to it by the apparatus.

Embodiment ∩ 5. The non-volatile data storage apparatus according to Embodiment ∩ 1, wherein authentication that the separate device will not breach the security or privacy of the sensitive information transmitted to it by the apparatus includes authentication or verification from a third-party authority.

Embodiment ∩ 6. The non-volatile data storage apparatus according to Embodiment ∩ 1, wherein authentication that the separate device will not breach the security or privacy of the sensitive information transmitted to it by the apparatus further includes authentication that the separate device has not been altered to change how it treats the sensitive information transmitted to it by the apparatus.

Embodiment ∩ 7. The non-volatile data storage apparatus according to Embodiment ∩ 1, further comprising an encryption module that encrypts the sensitive information stored in the non-volatile memory module and/or communicated with the coupled separate device.

Embodiment ∩ 8. The non-volatile data storage apparatus according to Embodiment ∩ 1, wherein upon receiving request for a piece of the sensitive information stored in the non-volatile memory module from the separate device, the processor transmits the sensitive information requested by the separate device to it if the separate device has been authenticated that it will not breach the security and privacy of the sensitive information transmitted to it by the apparatus.

Embodiment ∩ 9. The non-volatile data storage apparatus according to Embodiment ∩ 1, wherein the data storage contains at least a part of the data or codes needed by the execution of the one or more programs or apps in a coupled separate device, and upon receiving request from the separate device, the processor transmits the at least a part of the data or codes to the separate device to support the execution of the one or more programs or apps in the separate device.

Embodiment ∩ 10. The non-volatile data storage apparatus according to Embodiment ∩ 1, further comprising a processor which executes one or more applications installed in the apparatus and uses the separate device as the display and means of receiving user input for executing the one or more applications.

Embodiment ∩ 11. The non-volatile data storage apparatus according to Embodiment ∩ 1, further comprising a second wireless module to provide a connection to a mobile wireless network to the separate device coupled with the apparatus through the first wireless module.

Embodiment ∩ 12. The non-volatile data storage apparatus according to Embodiment ∩ 1, further comprising a biometric sensor to detect the identify of user, wherein the apparatus only functions after verifying the identity of the user using the biometric sensor.

Embodiment ∩ 13. The non-volatile data storage apparatus according to Embodiment ∩ 12, wherein the biometric sensor monitors one or more biometric or physiological signals of the user to detect removal of the non-volatile data storage apparatus from the user's body, causes one or more actions to be activated once a removal is detected to prevent loss of the apparatus or to maintain the security or privacy of the sensitive information.

Embodiment ∩ 14. The non-volatile data storage apparatus according to Embodiment ∩ 1, further comprising a Wireless Personal Area Network (WPAN) module to provide network connectivity, processing, and/or storage to one or more personal devices that a user carries on or has embedded in his body.

Embodiment ∩ 15. The non-volatile data storage apparatus according to Embodiment ∩ 1, further comprising one or more auxiliary input and/or output modules embedded in the enclosure to facilitate the use of the separate device as the display and means of user input for the user to access or use a network, online account or app.

Embodiment ∩ 16. The non-volatile data storage apparatus according to Embodiment ∩ 1, further comprising embedded in the enclosure one or more modules whose function requires or is enhanced when it is worn on the user's body, including a physiological signal sensor, a health or activity monitor, a tactile output device, a drug delivery pump, a voice sensor, a gesture sensor, or a module that produces a signal that causes an action.

Embodiment ∩ 17. The non-volatile data storage apparatus according to Embodiment ∩ 1, wherein the processor initiates the coupling of the apparatus with the separate device through the first wireless module upon detecting a motion or gesture of the user wearing the apparatus, or a physical contact of the apparatus with the separate device.

Embodiment ∩ 18. The non-volatile data storage apparatus according to Embodiment ∩ 1, further comprising the processor monitors the idle time of interaction with the coupled separate device, the distance of separation between the apparatus and the coupled separate device, or the status of the wireless connection with the coupled separate device, and initiates decoupling with the separate device when a condition is met.

Embodiment ∩ 19. The non-volatile data storage apparatus according to Embodiment ∩ 1, further comprising the processor accepting an instruction from the user and causes a command to be sent to a coupled separate device to complete a clean-up action.

Embodiment ∩ 20. The non-volatile data storage apparatus according to Embodiment ∩ 1, further comprising a wired connection port through which the non-volatile memory module can be accessed as an external storage drive by a computer or another device.

Embodiment ∩ 21. The non-volatile data storage apparatus according to Embodiment ∩ 1, further comprising a wired connection port and a power source, wherein the power source can be recharged via the wired connection port.

Embodiment ∩ 22. The non-volatile data storage apparatus according to Embodiment ∩ 1, further comprising a power source and a charging port for charging the battery of another device.

Embodiment ∩ 23. The non-volatile data storage apparatus according to Embodiment ∩ 1, further comprising a power source and a light emitting device powered by the power source for the apparatus to provide the function of a flashlight.

Embodiment ∩ 24. The non-volatile data storage apparatus according to Embodiment ∩ 1, further comprising a mobile payment module for the apparatus to be used as a secure mobile payment device.

Embodiment ∩ 25. The non-volatile data storage apparatus according to Embodiment ∩ 1, further comprising a device controller to interact or control an Internet of Things Device (IoTD)

Embodiment ∩ 26. The non-volatile data storage apparatus according to Embodiment ∩ 25, wherein the device controller causes information to or from an IoTD to be displayed on a display attached to the IoTD, or on a display not attached to the IoTD.

Embodiment ∩ 27. The non-volatile data storage apparatus according to Embodiment ∩ 1, further comprising a compartment or an attachment mechanism to store or securely attach an accessory device that is wirelessly connected to the apparatus, wherein the accessory device can be removed at the time of use.

Embodiment ∩ 28. The non-volatile data storage apparatus according to Embodiment ∩ 27, wherein the accessory device is one or more wireless headsets.

Embodiment ∩ 29. The non-volatile data storage apparatus according to Embodiment ∩ 27, wherein the accessory device's power source is charged by the power source in the apparatus when the accessory device is stored in or attached, to the apparatus.

Embodiment ∩ 30. The non-volatile data storage apparatus according to Embodiment ∩ 1, further comprising a companion device comprising an enclosure with a form factor that matches the apparatus and can be worn on a user's body next to or in contact with the apparatus; and contained with the enclosure one or more expansion modules that expand the function of the apparatus.

Embodiment ∩ 31. The non-volatile data storage apparatus according to Embodiment ∩ 30, wherein the one or more expansion modules in the companion device include a power source that provides additional power supply to or charges the apparatus when the companion device is worn next to or connected to the apparatus, a co-processor to enhance the performance of the apparatus, a wireless networking module to provide another wireless connectivity and/or additional throughput, a sensor or data collection module, an input or output module, or a memory module to expand the data storage of the apparatus.

Embodiment ∩ 32. The non-volatile data storage apparatus according to Embodiment ∩ 30, further comprising one or more matching connector(s) and/or receptacle port(s) on the apparatus and the companion device, and when the companion device is worn next to the apparatus, a connector on one can insert into a matching receptacle port on the other to achieve the intended expansion of a function.

Embodiment ∩ 33. A display and input apparatus comprising a display for displaying or presenting information, one or more means of accepting user input; an authentication module to authenticate the apparatus to a separate non-volatile data storage device in order to receive from which the sensitive information needed by the apparatus for the apparatus to provide the display and input for the user to access or use a network, online account or app; a processor that manages the functions of the apparatus; and a first wireless module for connecting with the separate non-volatile data storage device through a corresponding wireless module in the separate non-volatile data storage device, wherein the separate non-volatile data storage device only allows the connection with the apparatus for transmission of the sensitive information stored in its non-volatile memory to the apparatus if the authentication module successfully authenticates to the separate non-volatile data storage device that the apparatus will not breach the security or privacy of the sensitive information transmitted to it by the separate non-volatile data storage device, and wherein when the apparatus is coupled with the separate non-volatile data storage device through the first wireless module and when the connection for transmission of sensitive information from the separate non-volatile data storage device to the apparatus is allowed by the separate non-volatile data storage device, the non-volatile memory in the separate non-volatile data storage device storing the sensitive information and the apparatus function together like a single information processing device with the separate non-volatile data storage device providing and/or storing sensitive information for the said single information processing device to access or use a network, online account or app and the apparatus providing the display and input function for the said single information processing device to access or use a network, online account or app.

Embodiment ∩ 34. The display and input apparatus according to Embodiment ∩ 33, wherein the authentication to the separate non-volatile data storage device that the apparatus will not breach the security or privacy of the sensitive information transmitted to it by the separate non-volatile data storage device includes authentication that the apparatus will not transmit to a third party the sensitive information transmitted to it by the separate non-volatile data storage device.

Embodiment ∩ 35. The display and input apparatus according to Embodiment ∩ 33, wherein the authentication to the separate non-volatile data storage device that the apparatus will not breach the security or privacy of the sensitive information transmitted to it by the separate non-volatile data storage device includes authentication that the sensitive information transmitted to it by the separate non-volatile data storage device will be permanently erased if the communication between the apparatus and the separate non-volatile data storage device becomes unreliable or is turned off or disconnected, the apparatus is no longer in sufficiently close vicinity of the separate non-volatile data storage device, or the separate non-volatile data storage device transmits a clean-up command to the apparatus.

Embodiment ∩ 36. The display and input apparatus according to Embodiment ∩ 33, wherein the authentication to the separate non-volatile data storage device that the apparatus will not breach the security or privacy of the sensitive information transmitted to it by the separate non-volatile data storage device includes authentication or verification from a third-party authority.

Embodiment ∩ 37. The display and input apparatus according to Embodiment ∩ 33, wherein the authentication to the separate non-volatile data storage device that the apparatus will not breach the security or privacy of the sensitive information transmitted to it by the separate non-volatile data storage device further includes authentication that the apparatus has not been altered to change how it treats the sensitive information transmitted to it by the separate non-volatile data storage device.

Embodiment ∩ 38. The display and input apparatus according to Embodiment ∩ 33, further comprising a processor that executes one or more apps or programs and retrieves at least a part of the data or codes needed by the execution of the one or more apps or programs from a coupled separate non-volatile data storage device via the first wireless module.

Embodiment ∩ 39. The display and input apparatus according to Embodiment ∩ 33, wherein the processor permanently erases the data received from or generated through the interaction with a coupled separate non-volatile data storage device upon disconnection from the separate non-volatile data storage device or upon receiving a clean-up command from a coupled separate non-volatile data storage device or from an authenticated server.

Embodiment ∩ 40. The display and input apparatus according to Embodiment ∩ 33, wherein when the apparatus is coupled to the separate non-volatile data storage devices of more than one users, or is shared publicly by a large number of users, the processor guarantees the separation and security or privacy of the data of each user.

Embodiment ∩ 41. The display and input apparatus according to Embodiment ∩ 33, further comprising an decryption module that decrypts the encrypted sensitive information received from, the coupled separate non-volatile data storage device.

Embodiment ∩ 42. The display and input apparatus according to Embodiment ∩ 33, further comprising an encryption module that encrypts the sensitive information received from or generated through the interaction with the coupled separate non-volatile data storage device.

Embodiment ∩ 43. The display and input apparatus according to Embodiment ∩ 33, wherein when a piece of the sensitive information stored in the separate non-volatile data storage device is needed by an app or program, the processor sends a request for the sensitive information to the separate non-volatile data storage device, and upon receiving the requested sensitive information, provides the sensitive information to the app or program.

Embodiment ∩ 44. The display and input apparatus according to Embodiment ∩ 33, wherein at least a part of the data or program needed by the execution of the one or more apps in the apparatus is stored in the separate non-volatile data storage device, and the processor requests the at least a part of the data or program from the separate non-volatile data storage device, and upon receiving the requested data or program, executes the one or more apps in the apparatus.

Embodiment ∩ 45. The display and input apparatus according to Embodiment ∩ 33, further comprising a second wireless module to provide a connection to a mobile wireless network.

Embodiment ∩ 46. The display and input apparatus according to Embodiment ∩ 33, wherein the processor initiates the coupling of the apparatus with the separate non-volatile data storage device through the first wireless module upon detecting a physical contact of the apparatus with the separate non-volatile data storage device.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A Wearable Wireless Personal Server (WWPS) comprising
   a case or shell in a form factor that can be securely worn on or attached to a user's body and houses the components of the WWPS,
   a first wireless module for establishing a direct wireless connection and communication with one or more wirelessly coupled Processing and Display Devices (PDDs) wherein a PDD is in its own physical enclosure, is physically separate from the WWPS and functions as a graphic display and/or input device for the wirelessly coupled WWPS;
   an authentication module that manages the wireless pairing with and authentication of one or more PDDs, wherein the authentication certifies that a public or shared PDD will not record a user's information and/or will complete a Clean-Up Action (CUA), and wherein the CUA includes erasing or wiping clean of the display of the user's information on the public or shared PDD;
   a data security module that manages what information can be sent to and/or accepted from the public or shared PDD based on a security authentication of the authentication module to ensure that WWPS only sends and/or accepts sensitive information with the public or shared PDD whose pairing with the WWPS has been authorized by an owner of the WWPS;
   a memory module that stores personal or sensitive information of the user and the programs to be executed by the processor to implement the functions of the WWPS,
   a processor that serves the information stored in the memory module for display on one or more PDDs wirelessly coupled with the WWPS through the first wireless module, and a power source.

2. The Wearable Wireless Personal Server in claim 1 wherein the case or shell in the form factor of a bracelet worn on a wrist of a user.

3. The Wearable Wireless Personal Server in claim 1 wherein the processor further processes stored or received information on the processor before serving for display on one or more PDDs wirelessly coupled with the WWPS through the first wireless module.

4. The Wearable Wireless Personal Server in claim 1 wherein the first wireless module receives input entered on or using one or more coupled PDDs and provides the received input as user input to the WWPS.

5. The Wearable Wireless Personal Server in claim 1 further comprising a wireless networking module for establishing connectivity to a local and/or wide area network to support data communication needs of the WWPS and/or one or more PDDs wirelessly coupled with the WWPS through the first wireless module.

6. The Wearable Wireless Personal Server in claim 5 wherein the processor executes one or more application programs stored in the memory module wherein the connection to a wireless network is provided by the wireless networking module, and the visual display of the one or more executing application programs is provided by one or more PDDs wirelessly coupled with the WWPS through the first wireless module.

7. The Wearable Wireless Personal Server in claim 1 further comprising a Wireless Personal Area Network (WPAN) module to provide network connectivity, processing, analysis, and/or storage to one or more personal devices that a user carries on or embedded in his body.

8. The Wearable Wireless Personal Server in claim 7 wherein the one or more personal device is a physiological signal sensor, a health or activity monitors, a drug delivery pump, a device that produces an output signal, or a wireless headset.

9. The Wearable Wireless Personal Server in claim 1 further comprising one or more input and/or output module embedded in the case or shell.

10. The Wearable Wireless Personal Server in claim 9 wherein the one or more input or output module is a touchscreen, a microphone, a gesture sensor, physiological signal sensor, a health or activity monitor, a display screen, a speaker, a tactile output device, a drug delivery pump, or a device that produces a signal that causes an action.

11. The Wearable Wireless Personal Server in claim 1 wherein the security module encrypts the information stored in the WWPS.

12. The Wearable Wireless Personal Server in claim 1 wherein the security module uses biometric recognition to recognize that it is being worn by its registered owner.

13. The Wearable Wireless Personal Server in claim 1 wherein the security module monitors one or more biometric or physiological signals of the owner to detect removal of the WWPS from the owner's body.

14. The Wearable Wireless Personal Server in claim 13 wherein the security module further causes one or more actions to be activated once a removal is detected to maintain the security of the owner's data.

15. The Wearable Wireless Personal Server in claim 1 wherein the security module detects close proximity, motion, gesture, physical contact or a combination to initiate a pairing process.

16. The Wearable Wireless Personal Server in claim 1 wherein the security module monitors the idle time of interaction with a coupled PDD, the distance of separation between the WWPS and a coupled PDD, or status of the direct wireless connection with a couple PDD, and initiates unpairing with the PDD when a condition is met.

17. The Wearable Wireless Personal Server in claim 1 wherein the security module causes a command to be sent to the PDD to complete a clean-up action.

18. The Wearable Wireless Personal Server in claim 1 wherein the security module accepts an instruction from the owner and causes a command to be sent to a coupled PDD to complete a clean-up action.

19. A system comprising the Wearable Wireless Personal Server of claim 1 and a companion device for the Wearable Wireless Personal Server (WWPS), wherein the companion device comprises a case or shell in a form factor that matches the WWPS and can be worn on a user's body next to the WWPS; and a power source that charges the WWPS when the companion device is worn next to the WWPS or connected to the WWPS.

20. A Processing and Display Device (PDD) that can provide visual display for the wirelessly connected Wireless Wearable Personal Server (WWPS) in claim 1, comprising:
    an embedded first wireless module for communication with the wirelessly connected WWPS;
    a graphic display control and processing module;
    a memory module;
    an authentication module that works with an authentication module of the WWPS in claim 1;
    a power source; and
    a display screen,
    wherein the PDD is in its own physical enclosure separated from the WWPS and functions as a graphic display and input device for the wirelessly connected WWPS,
    wherein the data for the graphic display is served by the wirelessly connected WWPS through the first wireless module,
    wherein an authentication certifies that, if the PDD is public or shared, then it will not record a user's information and/or will complete a Clean-Up Action (CUA), and wherein the CUA includes erasing or wiping clean of the display of the user's information on the PDD, and
    wherein a security authentication ensures that the wirelessly connected WWPS only sends and/or accepts sensitive information with the PDD whose pairing with the wirelessly connected WWPS has been authorized by an owner of the WWPS.

* * * * *